J. H. RIGGS.
Ox-Yoke.
No. 21,087.
2 Sheets—Sheet 1.
Patented Aug 3, 1858.
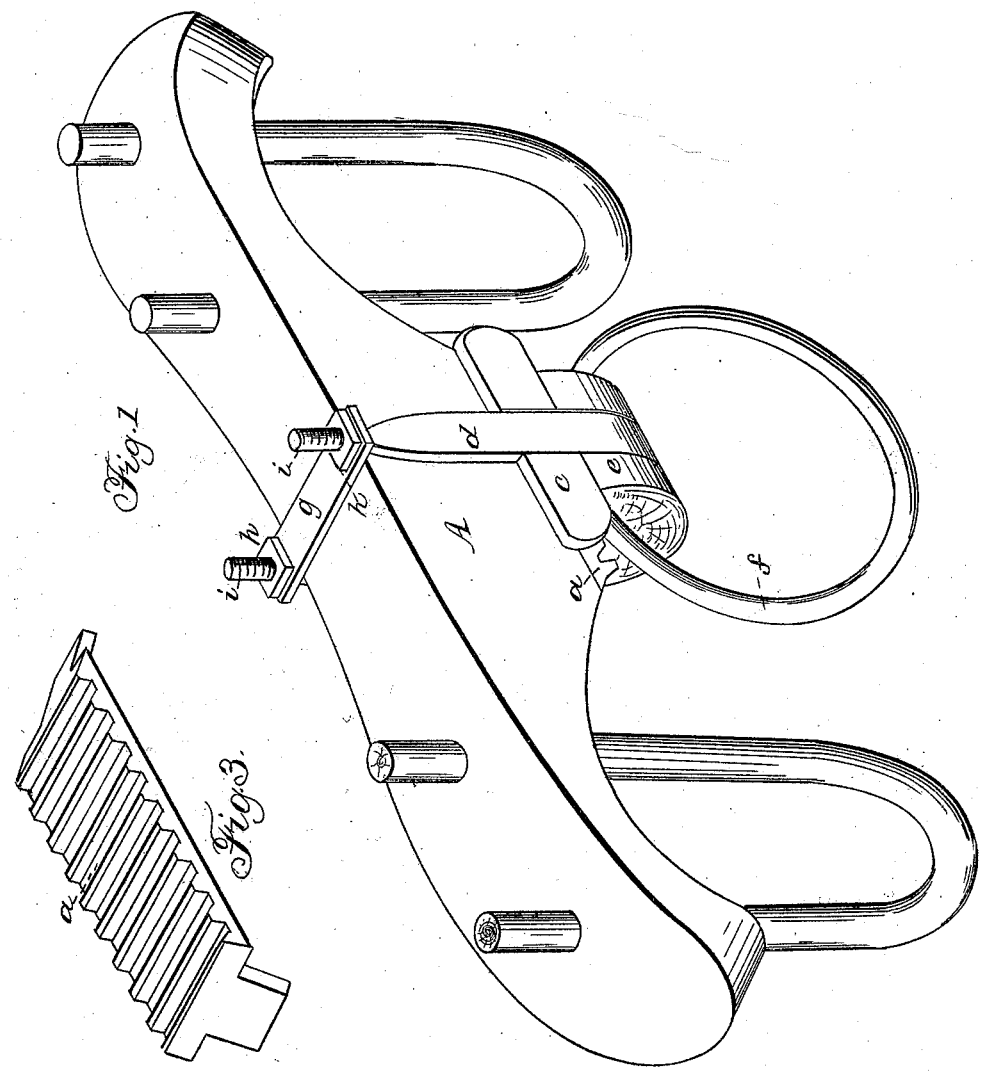

J. H. RIGGS.
Ox-Yoke.
No. 21,087.
2 Sheets—Sheet 2.
Patented Aug. 3, 1858.
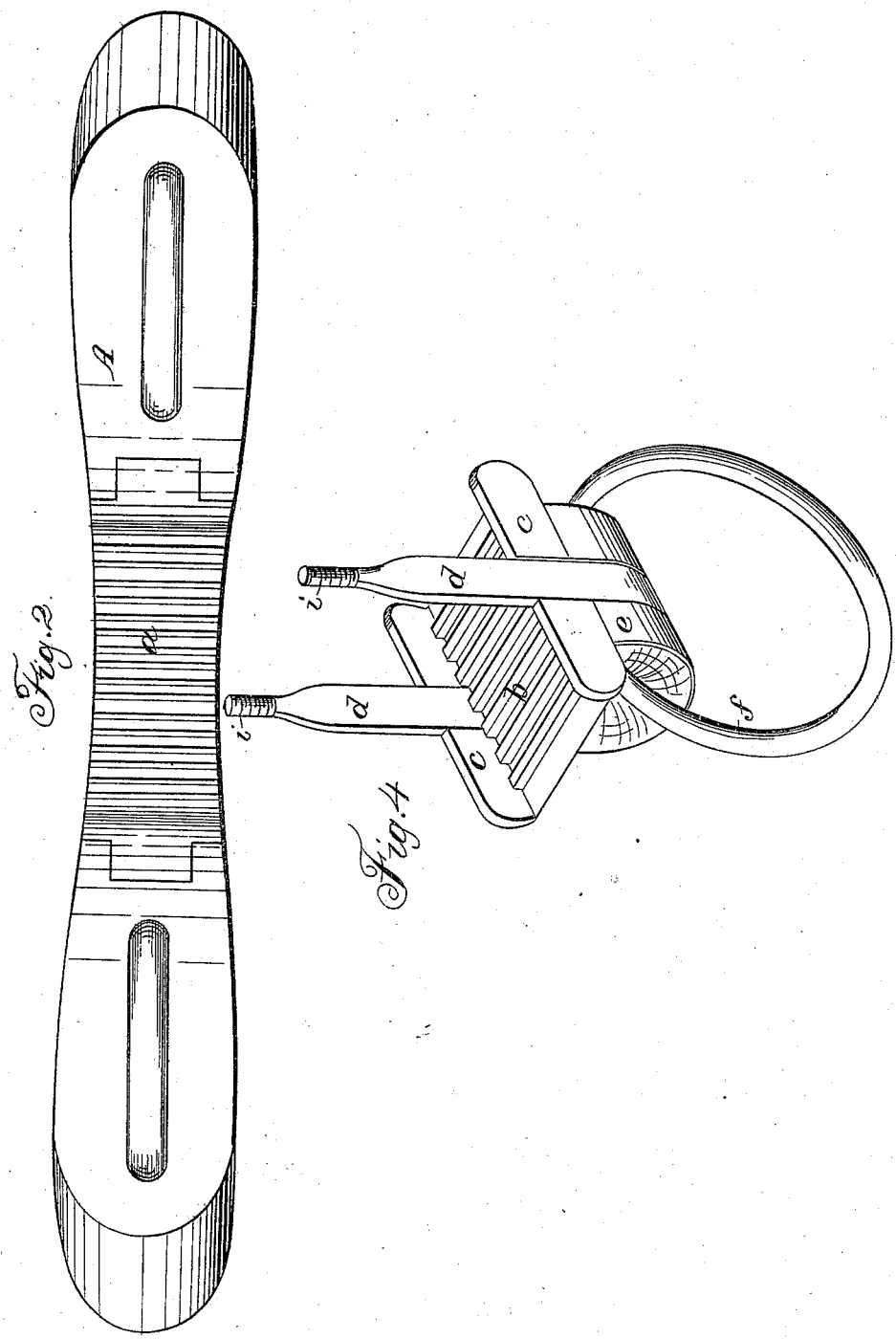

UNITED STATES PATENT OFFICE.

JOSEPH H. RIGGS, OF GLOUCESTER, MASSACHUSETTS.

OX-YOKE.

Specification of Letters Patent No. 21,087, dated August 3, 1858.

*To all whom it may concern:*

Be it known that I, JOSEPH H. RIGGS, of Gloucester, in the county of Essex and State of Massachusetts, have invented certain new and useful Improvements in Ox-Yokes, of which the following is a full, clear, and exact description, reference being had to the accompanying drawings, making part of this specification, in which—

Figure 1 is a perspective view of my improved yoke; Fig. 2, a plan of the same from the under side, the ring and staple being removed; Figs. 3 and 4, details to be referred to hereafter.

It is often desirable to have an ox yoke adjustable, so that the point of draft may be brought nearer to one end than the other, and thus give the smaller or weaker one of a pair of cattle the advantage over his mate.

I am aware that yokes have been constructed in which the position of the two bows with respect to each other, could be varied; but such arrangements for adjusting the length of the yoke itself have been found to possess many disadvantages and have not found favor with the agricultural community. They added materially to the cost of construction, and often to the weight of the yoke, while the parts were liable to wear and derangement, and the yoke became less reliable than one made of a single solid piece of wood.

The object of my present invention is to retain all the advantages of lightness, cheapness and durability possessed by the common yoke, and yet render the point of draft adjustable. The manner in which I have carried this out will now be more fully set forth and described, so that others skilled in the art may understand and use my invention.

In the drawings A is the yoke with its bows, made similar to those in common use. To the lower edge of the yoke is attached (by bolts or by letting into the wood) a rack *a* (detached and turned upside down in Fig. 3). This may be a simple plate of metal cast of the required form and of a width equal to the thickness of the yoke. Another rack *b*, Fig. 4—the teeth and grooves of which correspond to those in the rack *a*—is furnished with lips or flanges *c*, which are turned up on each side and lap over the edges of the rack *a*. These lips are notched out at the middle of their length to receive a staple *d*, which embraces the yoke as in Fig. 1. Beneath the rack *b* and embraced by the staple *d* is a block *e*, of the proper form to receive the ring *f*, by which the cattle draw. The staple *d* passes up on each side of the yoke. A bar or washer *g* rests on the top of the yoke, and the ends of the staple *d* pass through it and are drawn up tight to the yoke by nuts *h* on screws *i* formed on the two ends of the staple. This draws the two racks *a*—*b* into close contact, the teeth of one entering the grooves of the other, and prevents any lateral movement of the block *e* and ring *f*.

When it is desired to adjust the point of draft nearer to one end of the yoke than the other, it is only necessary to loosen the nuts *h* and back down the staple *d* until the two racks *a* and *b* are free from each other, when the latter one may be moved along one or more notches, as required, and the staple be again drawn up, when the whole apparatus will be held together firm and rigid. Thus by a simple and durable arrangement of parts which may be attached to a yoke of the ordinary construction, I attain the desired object.

What I claim as my invention and desire to secure by Letters Patent is,

The racks *a* and *b* arranged and operating in the manner substantially as herein set forth, for the purpose specified.

JOSEPH H. RIGGS.

Witnesses:
SOLOMON POOLE,
CHAS. C. PETTINGALE.